Jan. 6, 1925.

L. B. CONANT 1,522,105

PROCESS OF MAKING HEELS AND THE LIKE

Original Filed March 14, 1921

Inventor,
Leon B. Conant;
By
A. B. Upham,
Attorney.

Patented Jan. 6, 1925.

1,522,105

UNITED STATES PATENT OFFICE.

LEON B. CONANT, OF CAMBRIDGE, MASSACHUSETTS, ASSIGNOR TO GEORGE M. CONANT, OF BRIDGEWATER, MASSACHUSETTS.

PROCESS OF MAKING HEELS AND THE LIKE.

Application filed March 14, 1921, Serial No. 452,083. Renewed June 7, 1923.

*To all whom it may concern:*

Be it known that I, LEON B. CONANT, a citizen of the United States, and a resident of Cambridge, in the county of Middlesex and Commonwealth of Massachusetts, have invented certain new and useful Improvements in Processes of Making Heels and the like, of which the following is a full, clear, and exact specification.

This invention, while specifically designed for the manufacture of heels for boots and shoes, is also well adapted for the production of other articles wherein fibre is to have rubber composition vulcanized thereto.

Prior to my invention it was considered impossible to vulcanize a rubber tread to a fibre lift because of injury to the latter due to the heat. The injury, I found, being due to the excessive fatty-content when leather scrap was used, and to the blistering effect caused by the oil which was produced from the fatty content by the heat. I further discovered that when vegetable fibre was vulcanized in conjunction with rubber, the fibre was so dried by the heat as to deprive it of life and so weaken its cohesive quality as to render it useless for the purpose.

After further experimentation I finally discovered that by suitably intermixing a vegetable fibre with a limited proportion of oily matter, or by combining animal fibre and vegetable fibre, and providing therefor a limited oily content, the same would endure the heat of vulcanization not only without injury, but with positive benefit through the impregnation of the fibre with the oil and a resultant water-proofing thereof, or at least a decided resistance to the absorption of moisture.

Figure 1:
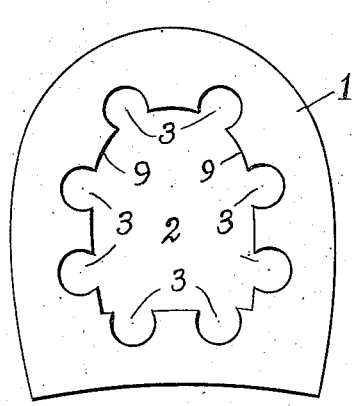
Figure 2:
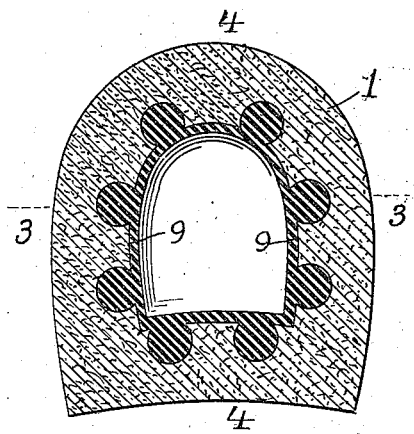
Figure 4:
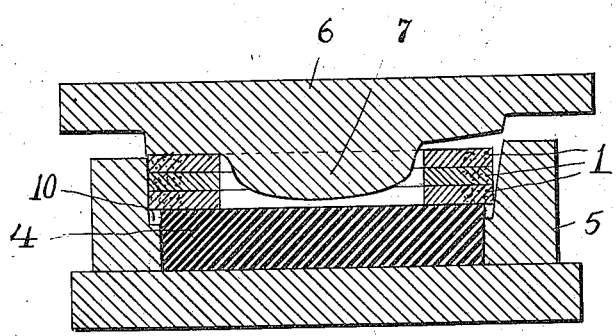
Figure 3:
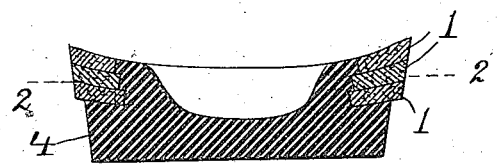
Figure 5:
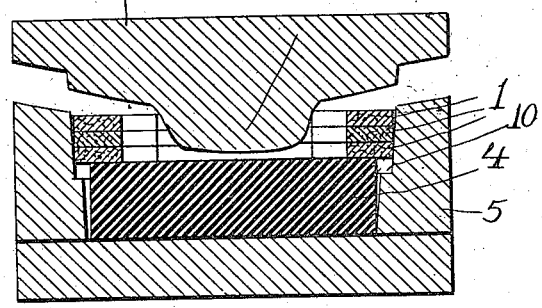

In the drawings forming part of this specification, Fig. 1 is a plan view of an element of the fiber base. Fig. 2 is a section on the line 2—2 in Fig. 3. Fig. 3 is a cross section on the line 3—3 in Fig. 2. Fig. 4 is a longitudinal section of the heel in process of vulcanization, showing the mold. Fig. 5 is a cross section through the line 3—3 in Fig. 2 showing the heel in the process of being vulcanized.

In making the heel, I take one or more blanks 1 composed of fibrous material and preferably having a large central opening 2 and formed with several scallops 3 or other perforations and a block of unvulcanized rubber or rubber composition 4 which is to compose the tread of the heel, the fiber layers or lifts composing the base designed to be preferably attached directly to the shoe.

The rubber block 4 is deposited in a mold 5, and the layers of fiber 1 placed upon the rubber, as shown in Figs. 4 and 5. Then the follower 6 is pressed down thereon, and with combined pressure and heat, the desired heel is produced. Under the pressure given by the mold, and controlled by the boss 7, the rubber rises upward and completely fills all the scallops 3, or other perforations and also the entire space between the wall 9 of the opening 2 and the surface of the boss 7. As shown in Fig. 3, when the fiber lifts 1 are pressed into the cupped shape illustrated, the successive perforations 3 will be forced out of alinement and given a series of steps into which the rubber fits and by means of which the grip between the rubber and fiber lifts is increased.

In addition to this grip, I find that the rubber imbeds and clings to the minute surface fibers of the base, and thereby binds itself tightly to the base. By the application of suitable force, however, the rubber tread by stripping away a part of the fibre, can be torn away from the base, leaving a comparatively smooth surface to which to nail a rubber tread of well known form.

In carrying my process into effect, I intermix preferably about one-half each of animal fibre and wood or rag fibre, sheeting the same in a well known manner, and stamp therefrom the lifts 1. As above stated, animal fibre will not serve this purpose if it contains too much oil. Therefore I prefer to use fibre from which a large proportion of its oily content has been removed. The nearest approximation to such a fibre now on the market, I have found to be what is known as chrome leather, but this is too far in the other direction, not possessing an oily content sufficient for my purpose.

But, by mixing a suitable proportion of other animal fibre with the chrome leather, or otherwise adding a limited oily content thereto, I am able to accomplish my object. The preferable proportion of the two kinds of material is about one part of the ordinary animal fibre to two parts of the chrome leather, so that the proportion of oily content to the combined leather and other fibre will accomplish the desired result. Because of the wide range of variation in vulcanization and compounding in the rubber industry, the application of this process must be adapted to a variety of requirements, each one in itself a prime factor having direct bearing upon the proportion of oleaginous content best adapted therefor, and where two processes of compounding and vulcanization are dissimilar as to percentage of sulphur in the compound, degree of temperature and amount of pressure and condition of stock, the fatty content might be of maximum per cent in the one case and minimum in the other. For example, a combination of 310° F., 3% of sulphur, 2500 lbs. on accumulator dial, 90 lbs. steam and green stock, requires a minimum content; whereas 260° F., 1% of sulphur, 1500 lbs. on accumulator dial, 50 lbs. steam and old stock, permits a maximum of oleaginous content.

While preferably such content is about 3%, many heel manufacturers, rather than change their compounding, heats, etc., would require that the fibre lifts sold to them be reconciled as to oleaginous content to their own particular processing. Hence it is obvious that in supplying the lifts to the trade not only will different conditions be encountered but that it will be necessary in many cases in order to gain co-operation to adapt the fatty content to particular methods of processing.

The lifts 1 having been thus prepared, a block 4 of unvulcanized rubber is deposited in the mold 5, and preferably three lifts placed upon the rubber. Then by a combination of heat and pressure, the rubber is forced into intimate union with the lifts and vulcanized therein, and the oily content of the animal and other fibre is converted into an oil and the latter distributed throughout the mass of fibre.

This oil being insufficient to form the blisters above referred to, and, on the other hand, being enough to prevent the drying and resultant injury also recited, both the fibre base and the rubber tread are found to be strongly united and each of miximum durability. Further, the penetration of the oil throughout the fibre renders the latter strongly moisture-resisting, and thereby prevents the disintegrating effect of mud and water thereon.

In case it is desirable to cut the lifts 1 from the hide instead of from sheeted scrap, this hide to render it suitable for the purpose, must be given a suitable oily content. To this end, the leather is given a bath in a solution containing tallow, paraffin or glycerine, or other suitable oleaginous material.

Having provided a base of fibrous material with a suitable oily content, the process establishes in addition thereto certain further provisions, i. e., as shown in Fig. 3, the top face of the rubber is cupped to conform to the convex bottom surface of the heel base, and the lifts comprising the base are correspondingly cupped, thus throwing their perforations out of alinement and staggering the contacting surfaces of the rubber portions therein. Fig. 3 also shows the rubber tread portion as smaller laterally than the base, giving the latter an overhanging shoulder, and providing the shoe manufacturer with a more easily attached heel.

For this purpose, the mold 5, as shown in Figs. 4 and 5, is provided with a shoulder 10 upon which the base seats under compression, thereby ensuring a clean line of juncture for the rubber as well as a shoulder for the heel base.

What I claim is:

1. The herein described process of vulcanizing rubber to fibrous material for producing combination heels and the like, which consists in providing a mold the walls of whose cavity contains a shoulder spaced to relatively define the position of the portions composing the heel, introducing within said cavity a biscuit of rubber composition and a plurality of perforated plies of fibrous material having an oleaginous content, the former to compose the tread and the latter the base of the heel, applying heat and pressure thereto, whereby the lower of said plies is forced into approximate contact with said shoulder.

2. The herein described process of vulcanizing rubber to fibrous material for producing combination heels and the like, which consists in providing a mold the wall of whose cavity contains a shoulder spaced to define the relative positions of the portions composing the heel, introducing within said cavity a biscuit of rubber composition and a plurality of perforated plies of fibrous material having an oleaginous content, the former becoming the tread and the latter the base of the heel, and applying heat and pressure thereto, whereby the said plies are forced on said shoulder, crimping the peripheral portions thereof to form a flange, cupping said plies to conform to the mold, throwing out of alinement said perforations, staggering the teats of rubber composition pressed therein, imparting like cupping to the upper face of said tread, vulcanizing the rubber portion, redistributing the oleaginous content of the fibrous portion throughout the mass, and uniting and waterproofing the parts forming a compact whole In testimony that I claim the foregoing invention, I have hereunto set my hand this 12th day of March, 1921.

LEON B. CONANT.